United States Patent [19]

Ishigaki

[11] 4,081,560
[45] Mar. 28, 1978

[54] INSTANT MILK-CONTAINING COFFEE

[75] Inventor: Takayoshi Ishigaki, Tokyo, Japan

[73] Assignee: Ishigaki Shokuhin, Inc., Tokyo, Japan

[21] Appl. No.: 733,189

[22] Filed: Oct. 18, 1976

[30] Foreign Application Priority Data

Nov. 18, 1975 Japan .............................. 50-156455[U]
Dec. 17, 1975 Japan .............................. 50-170275[U]

[51] Int. Cl.² ............................................. B65D 81/32
[52] U.S. Cl. .................................... 426/115; 206/497; 426/106; 426/410
[58] Field of Search ................................ 426/77-84, 426/86, 115, 119, 120, 134, 103, 89-91, 93, 96, 99, 106, 108, 112, 594, 595, 597, 410; 206/219, 497

[56] References Cited

U.S. PATENT DOCUMENTS

| 1,931,765 | 10/1933 | Leever | 426/78 |
|---|---|---|---|
| 2,330,884 | 10/1943 | Harriman | 426/78 |
| 2,745,751 | 5/1956 | Pichardo | 426/115 |
| 3,275,448 | 9/1966 | Sommer | 426/115 |
| 3,326,363 | 6/1967 | Bennett et al. | 426/115 |
| 3,386,837 | 6/1968 | Arnot | 426/112 |
| 3,655,410 | 4/1972 | Forkner | 426/410 X |
| 3,869,555 | 3/1975 | Heonis | 426/594 X |
| 3,892,867 | 7/1975 | Schoonman | 426/594 X |
| 3,922,363 | 11/1975 | Mitsuda et al. | 426/410 |

FOREIGN PATENT DOCUMENTS

| 503,468 | 6/1951 | Belgium | 426/594 |
|---|---|---|---|
| 2,086,669 | 12/1971 | France | 426/103 |

OTHER PUBLICATIONS

Modern Packaging, 4/54, pp. 102, 103.

Primary Examiner—Steven L. Weinstein
Attorney, Agent, or Firm—Wenderoth, Lind & Ponack

[57] ABSTRACT

An instant milk-containing coffee is disclosed. The instant milk-containing coffee includes dried coffee, cream powder and sugar together contained in a single elongated bag. They are sealed and tightly packed so as not to move from their original positions and mix with each other.

2 Claims, 5 Drawing Figures

INSTANT MILK-CONTAINING COFFEE

BACKGROUND OF THE INVENTION

This invention relates to an instant milk-containing coffee packed in a bag and more particularly to an instant milk-containing coffee packed in a bag which may be stored for a long period of time without alteration.

Everybody agrees that it is possible to prepare a cup of instant coffee containing milk and sugar by preparing a package containing instant coffee, cream and sugar and pouring boiling water over these ingredients. However, an instant milk-containing coffee combination is subject to alteration because the acid in the coffee causes the milk fat and milk protein in the cream to become rancid when the two are mixed together. This makes the long term storage of the milk-coffee impossible and has prevented this kind of a product from being put on the market. For this reason, an imitation mixed coffee containing vegetable fat powder and no cream has recently been marketed. However, this is no more than an imitation milk-containing coffee drink which cannot be called a real coffee containing cream. In addition, this imitative product cannot be stored for a long term because it contains milk protein which reacts with the acid in the coffee.

In the past, although a real packaged coffee containing cream has been strongly desired and various attempts have been made to produce it, a perfect rancid-free product has not yet been proposed.

In general, there is a difference in individual tastes not only for coffee but also food and drinks. For instance, one person prefers coffee with cream but without sugar while another person may enjoy a cup of black coffee with sugar. Therefore, it is desired that all kinds of milk-coffee combinations be available to coffee drinkers to allow a choice according to individual tastes.

Accordingly, it is an object of the present invention to provide an instant milk-containing coffee packed in a bag which is storable for a long term without alteration.

It is another object of the present invention to provide an instant milk and instant coffee combination packed in a bag wherein the amount of sugar or milk is easily adjustable to provide a milk coffee suitable for various kinds of tastes.

It is a further object of the present invention to provide an instant milk and instant coffee combination packed in a bag wherein a cup of milk coffee is prepared simply by opening the bag and pouring the mixture into a cup of boiling water or vice versa.

BRIEF DESCRIPTION OF THE INVENTION

According to the present invention, there is provided an instant milk-instant coffee combination wherein dried coffee, sugar and cream powder are sealed and tightly contained in a single elongated bag to immobilize each of the contained materials.

In a preferred embodiment, dried coffee and cream powder are arranged so as not to be in contact with each other with sugar positioned therebetween.

According to this embodiment of the present invention, the alteration of milk fat and milk protein in cream is perfectly avoided because the dried coffee and cream are separated by the sugar.

In another preferred embodiment, sugar or cream is contained in the bag and positioned at the one end thereof making it easy to control the amount to be put into a cup.

According to the present invention, there is avoided the alteration of milk fat and milk protein in cream because the dried coffee and cream are never mixed. This is due to the arrangement in which they are tightly contained and immobilized in the bag.

BRIEF DESCRIPTION OF THE DRAWING

The aforementioned and other objects and features of the present invention shall be described hereinafter in detail with reference to preferred embodiments thereof shown in the accompanying drawing.

DETAILED DESCRIPTION OF THE INVENTION

Figure 1:
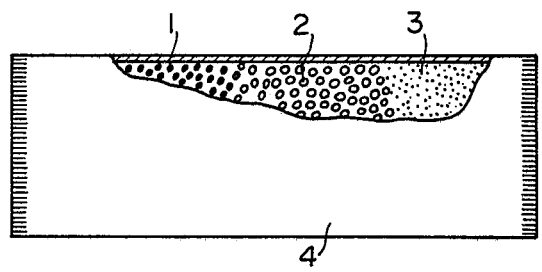
FIG. 1 is a partially cutaway top view for illustrating a preferred embodiment of an instant milk-containing coffee according to the present invention.

Referring now to FIG. 1, there is shown an instant milk-containing coffee including dried coffee 1, sugar 2 and cream powder 3, each sealed and tightly contained in a moisture-proof elongated bag 4. The coffee 1 and the cream powder 3 are arranged at the opposite ends of the bag 4 to avoid contact therebetween.

Figure 2:
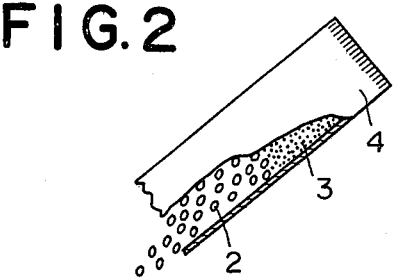
FIG. 2 is a partially cutaway perspective view for illustrating that the contained materials are put into a cup in the embodiment shown in FIG. 1.

In FIG. 2, there is shown an illustration for explaining the manner that the instant milk-containing coffee is put into a cup 5. The coffee 1, the sugar 2 and the cream powder 3 are in turn dropped from the opening at one end of the bag 4 into the cup 5. A cup of coffee having cream is easily prepared simply by pouring boiling water after the materials contained in the bag 4 are transferred into the cup.

In the above-mentioned embodiment, the alteration and rancidity never occur because the coffee and the cream powder are not absolutely in contact with each other in the bag, whereby the instant coffee according to the present invention is storable for a long period of time. Further, the amount of sugar or cream powder is easy to control because these ingredients are separated in the bag. This is quite different from a conventional instant coffee wherein the contained materials are mixed together in a bag. The bag 4 may be composed of paper or plastic. An alternative to the bag can also be utilized, i.e. a container or bottle.

Figure 3:
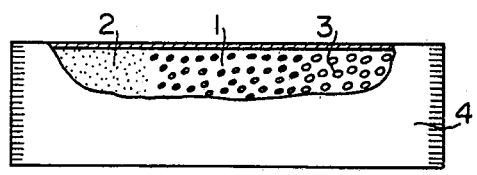
FIG. 3 is a partially cutaway top view for illustrating another preferred embodiment of an instant milk-containing coffee according to the present invention.
Figure 3:

With reference to FIG. 3, there is shown an instant milk-containing coffee including dried coffee 1, sugar 2 and cream powder 3 positioned in the middle, left and right, respectively, inside of a bag 4. They are sealed and tightly contained in the bag 4 by the adoption of, for instance, the vacuum draw process so that it is absolutely impossible for them to move and mix with each other. Therefore, the dried coffee 1 and the milk powder 3 are only in contact with each other at the border surface therebetween.

Figure 4A:
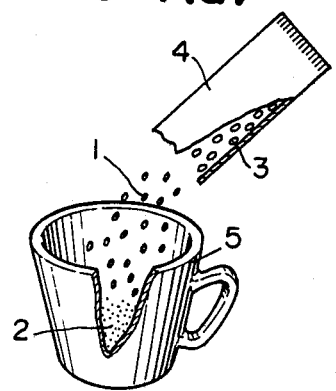
FIGS. 4(a) and 4(b) are partially cutaway perspective views respectively for illustrating that the contained materials are put into a cup in the embodiment shown in FIG. 3.
Figure 4B:
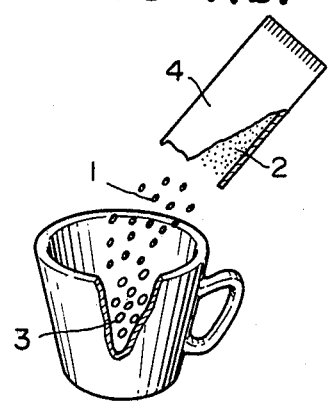

FIGS. 4(a) and 4(b) show two ways for preparing a cup of milk-coffee in accordance with the invention. FIG. 4(a) shows the amount control of milk and FIG. 4(b) shows the amount control of sugar. In FIG. 4(a), the sugar 2 and the coffee 1 have already been put into a cup 5 while only the cream powder 3 is left in the bag 4. Accordingly, a drinker who needs no milk may throw away the cream powder 3 to prepare a cup of black coffee. Another drinker who requires a small amount of milk may put the desired amount into the cup 5 and throw away the remainder.

In FIG. 4(b), the cream powder 3 and the coffee 1 have already been put into the cup while only the sugar 2 is left in the bag 4. Accordingly, a drinker who needs no sugar may throw away the sugar and another drinker who requires a little sugar may put a necessary amount of sugar into the cup 5 and throw away the remainder along with the bag 4.

Although the present invention has been described with reference to the preferred embodiments thereof, many modifications and alterations may be made within the spirit of the present invention.

What is claimed is:

1. A package containing dried coffee particles, cream powder and sugar components located in a moisture-proof bag of an elongated configuration, said dried coffee particles, cream powder and sugar components being inherently free-flowing, but positioned in the bag so that they are immobilized and separate and distinct from each other, except that the borderline surface of at least one of said coffee, cream and sugar components is in direct contact with the borderline of at least one of the other components in a direction substantially perpendicular with the elongated direction of the bag and wherein the components are immobilized by being sealed and tightly contained in the bag by vacuum so that they do not move from their original positions and mix with each other, but are capable of freely flowing out of the bag when the bag is opened and the vacuum broken.

2. A package according to claim 1, wherein said sugar is positioned between said dried coffee and cream powder to avoid direct contact between the dried coffee particles and cream powder.

* * * * *